United States Patent [19]

Kamamori et al.

[11] Patent Number: 4,610,507
[45] Date of Patent: Sep. 9, 1986

[54] COLOR LIQUID CRYSTAL DISPLAY DEVICE HAVING MULTICOLOR POLARIZERS

[75] Inventors: Hitoshi Kamamori; Yukiyoshi Tsunoda; Mitsuru Suginoya; Yutaka Sano; Yumiko Terada, all of Tokyo, Japan

[73] Assignee: Seiko Instruments & Electronics Ltd., Tokyo, Japan

[21] Appl. No.: 610,328

[22] Filed: May 15, 1984

[30] Foreign Application Priority Data

May 27, 1983 [JP] Japan .................. 58-93584

[51] Int. Cl.[4] ................ G02F 1/13
[52] U.S. Cl. ................ 350/335; 350/337; 350/339 F
[58] Field of Search ............ 350/335, 337, 339 F

[56] References Cited

U.S. PATENT DOCUMENTS

| 4,227,777 | 10/1980 | Murakami | 350/337 X |
| 4,241,339 | 12/1980 | Ushiyama | 350/337 X |
| 4,403,832 | 9/1983 | Tanaka et al. | 350/337 X |

FOREIGN PATENT DOCUMENTS 53-76049  7/1978  Japan ............... 350/337

Primary Examiner—John K. Corbin
Assistant Examiner—Richard F. Gallivan
Attorney, Agent, or Firm—Robert E. Burns; Emmanuel J. Lobato; Bruce L. Adams

[57] ABSTRACT

A liquid crystal display device comprising a first display of twisted-nematic (TN) or guesthost (GH) type in front of a second LCD of TN type in which a multicolor polarizer is provided on one cell substrate. The multicolor polarizer consists of two layers and multiple picture elements. The color polarizers of one layer of the multicolor polarizer have different wavelength regions and absorption axes perpendicular to the polarizer elements of the other layer.

3 Claims, 6 Drawing Figures

COLOR LIQUID CRYSTAL DISPLAY DEVICE HAVING MULTICOLOR POLARIZERS

BACKGROUND OF THE INVENTION

The present invention relates to a color liquid crystal display device in which a first display cell which has an optical shutter effect is disposed on a second liquid crystal cell which has a multi-color polarizing plate.

Display devices employing liquid crystals have advantages concerning low power consumption, reduced thickness and long life, and are used in a very wide range of applications including digital timepieces, pocket calculators, measuring instruments as well as, in recent years, instruments for automotive applications, liquid crystal TVs, and the like. Accompanying such a wide range of applications, demands have increased year after year for the provision of color display devices, and a variety of systems have already been devised. From the standpoint of practical applications, however, each have merits and demerits.

Two typical examples will be described below briefly.

First is exemplified a system which employs color filters and a twisted nematic liquid crystal cell (hereinafter referred to as TN liquid crystal cell). FIG. 1 is a schematic section thereof, in which a pair of polarizing plates 1, 2 are so arranged that their polarizing axes are oriented in the same direction, and a TN liquid crystal cell is inserted therebetween, the TN liquid crystal cell being obtained by twist-orienting a nematic liquid crystal composition. Color filters 5 of red (R), green (G) and blue (B), which are the three primary colors for light, are provided on transparent electrodes 6 disposed on one substrate 4 of the liquid crystal cell.

When no voltage is applied thereto, light is not permitted to pass through, and black is displayed. When a voltage is applied, however, the filter to which the voltage is applied displays its color. That is, if the filter has a fine pattern, the device theoretically works in the same manner as a color CRT, which makes it possible to realize a full color spectrum by the method of additive color mixing. According to this system, however, light is absorbed by the filter even when it is white, and the display has a very small transmission factor. For example, when red is to be displayed, the other picture elements of green (G) and blue (B) appear to be black. With a reflective type of device, therefore, the display produced has a dark reddish color. Therefore, a satisfactory color display is not realized unless the device is constructed to be of a transmission type which uses back light of a very high brightness. This cancels the advantage of low power consumption which is the greatest merit of a liquid crystal display device, and greatly restricts the range of applications.

Next is exemplified a system which employs a multi-color polarizing plate and a TN liquid crystal cell, FIG. 2 is a schematic section thereof. The multi-color polarizing plate consists of a plurality of color polarizing plates arranged within one polarizing plate. For instance, the multi-color polarizing plate has red (R), green (G) ahd blue (B) polarizing plates those are arranged in the form of stripes, as designated by 7 in FIG. 2. Transparent electrodes 6 are also provided so as to correspond to the stripes on the multi-color polarizing plate. If the polarizing axes of the polarizing plate 1 and the multi-color polarizing plate 7 are at right angles with each other, light is permitted to pass through when no voltage is applied, and a white display is produced. When a voltage is applied, on the other hand, light is absorbed by the color polarizing plate at the portion to which the voltage is applied, and the color of this color polarizing plate is displayed. If the stripes of the color polarizing plate have a small pitch, additive color mixing can be realized. For instance, a yellow display can be produced by applying voltages to the red (R) and green (G) polarizing plates. However, when, for example, a red display is produced, the other green and blue picture elements will produce white. Therefore, a dark reddish display is not produced even with a reflective type of device employing color filters. In this case, however, a display or a pale reddish color with a small saturation is produced. That is, although the display with a higher transmission factor than that of the system employing color filters is produced, it is difficult to obtain a sufficiently high contrast.

SUMMARY OF THE INVENTION

The present invention was accomplished in view of the defects inherent in the above two examples, and its object is to eliminate the necessity of back light that is traditionally required by systems employing filters to compensate for the low transmission factor, as well as improve the contrast which is not sufficient with systems employing color polarizing plates. For this purpose, according to the present invention, a first display cell having an optical shutter effect is disposed on a second TN liquid crystal cell which has a multi-color polarizing plate of double layer. Absorption axis of each layer is perpendicular to each other.

DETAILED DESCRIPTION OF THE PREFERRED EMBODIMENT

The invention will be described below in detail, with reference to embodiments thereof.

Figure 1:
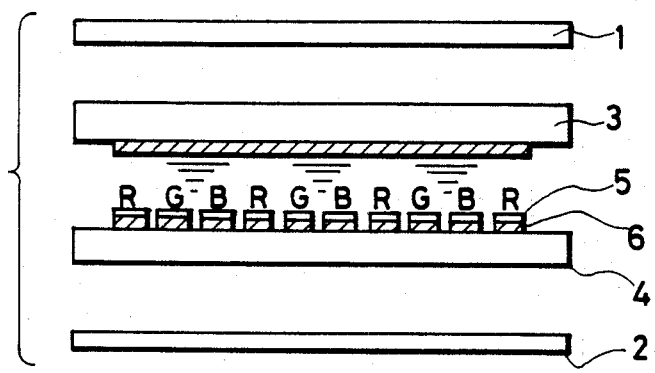
FIGS. 1 and 2 are schematic sections through conventional displays.
Figure 2:
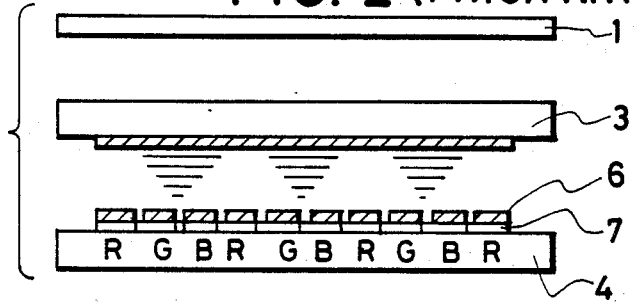
Figure 3:
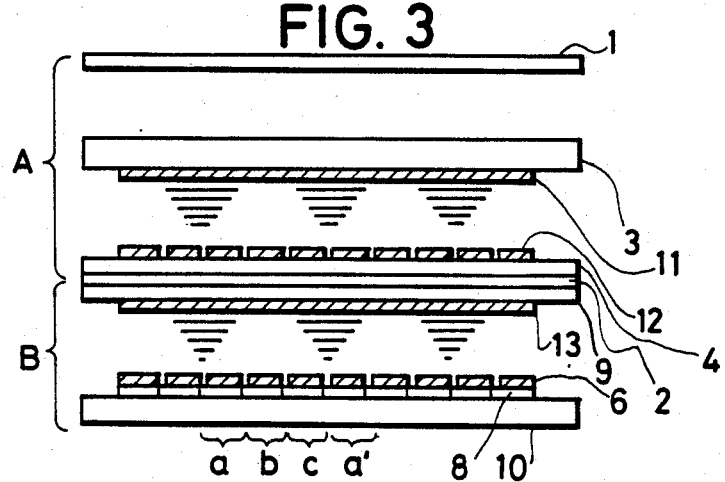
FIGS. 3, 5 and 6 are schematic sections through embodiments according to the present invention.

FIG. 3 is a schematic section of an embodiment of the present invention. A cell A is of the TN type sandwiched between a pair of polarizing plates 1, 2, and a cell B is of the TN type which has a multi-color polarizing plate 8 of double layer. Absorption axes of each layer having different absorption wavelength regions are aligned in two directions at right angles to each other. Transparent electrodes 11 and 12 of the cell A and, 13 and 6 of the cell B have picture elements respectively those correspond to each other.

Figure 4:
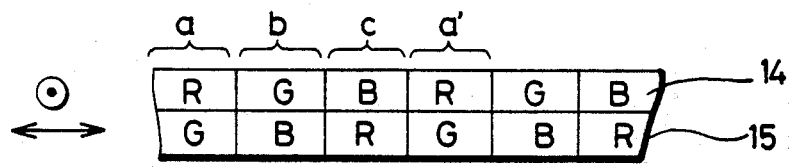
FIG. 4 is a schematic section through a multi-color polarizing plate which is employed in the present invention.

The multi-color polarizing plate of double layer in which the absorption axes of double layer having different absorption wavelength regions are perpendicular to each other, can be easily obtained by, for example, laminating together two multi-color polarizing plates so that their absorption axes are at right angles to each other, as shown in FIG. 4. In detail, a multi-color polarizing plate 14 with absorption axes for red (R), green (G) and blue (B) aligned in a direction perpendicularly to the surface of the paper is laminated onto a multi-color polarizing plate 15 with absorption axes for R, G and B aligned in a direction parallel to the surface of the paper, in such a manner that the same colors do not overlap. If light which is linearly polarized in the direction of the surface of the paper is incident upon the multi-color polarizing plate, a portion a in FIG. 4 produces green, a portion b produces blue, and a portion c produces red. If light which is linearly polarized in the direction perpendicular to the surface of the paper is incident, the color of portion a becomes red, the color of portion b becomes green, and the color of portion c becomes blue. Reference is now made to FIG. 3 in which the polarizing plate 1 has an absorption axis parallel to the surface of the paper, the polarizing plate 2 has an absorption axis in a direction perpendicular to the surface of the paper, and the polarizing plate of FIG. 4 is used as the multi-color polarizing plate 8. In this case, when no voltage is applied to either the cell A or the cell B, portion a produces red, portion b produces green, and portion c produces blue, and accordingly white is produced due to additive color mixing (the portions a, b, and c of FIG. 3 correspond to the portions a, b and c of FIG. 4). The principle up to this point is the same as that of the system employing color filters.

The features of the present invention will now be described with reference to a red display and a yellow display. The red display is produced by applying a voltage to portion b of cell A and to portion c of cell B. Portion b produces black since light is absorbed by the cell A, and portion c produces red which is the color of portion c of the multi-color polarizing plate 15 of FIG. 4, since cell B loses its optical activity when a voltage is applied thereto. That is, a red display is produced by two out of three picture elements, with twice the light transmission quantity of the red display that is produced by one out of three picture elements (in which the green and blue portions produce black) of the system employing color filters.

The yellow display is obtained by applying voltages to portion c and portion a' of cell B. That is, portions a, b produce the colors of the multi-color polarizing plate 14 of FIG. 4, and portions c and a' produce the colors of the multi-color polarizing plate 15, so that a yellow color display is produced by four out of four picture elements, by the color mixture of red and green. Therefore, a light transmission quantity is obtained which is 1.5 times that obtained by the yellow display by two out of three picture elements (in which the blue portion produces black) of the system employing color filters. High transmission factors are also obtained with all the other color displays. Further, since there is no white picture element, no color mixture with white takes place, and a sufficiently high contrast is obtained with the display of any color.

Figure 5:
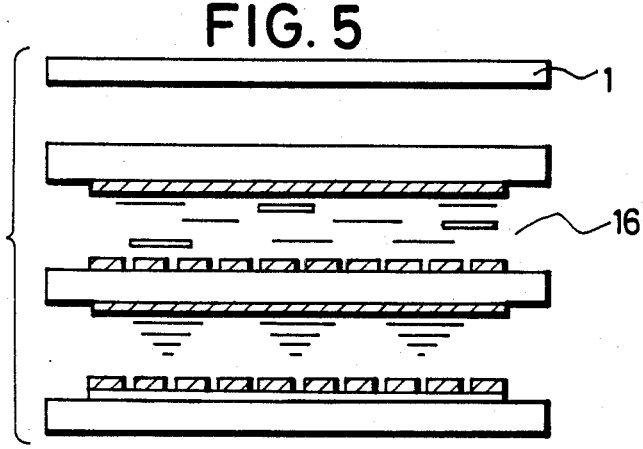
Figure 6:
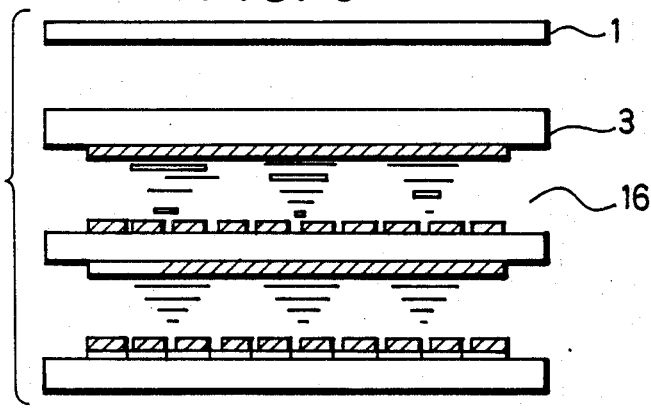

FIGS. 5 and 6 are schematic sections of displays in which a guest host liquid crystal cell (hereinafter referred to as GH liquid crystal cell) is used as the first display cell with the optical shutter effect. In either case, use is made of a P-type nematic liquid crystal composition (GH liquid crystal) 16 to which a black dichromic coloring matter has been added. In the embodiment of FIG. 5, the liquid crystal orientation is parallel, and in the embodiment of FIG. 6, it is twisted. The absorption axis of the polarizing plate 1 of FIG. 5 is at right angles to the direction of orientation of the GH liquid crystal, and the absorption axis of the polarizing plate of FIG. 6 is at right angles to the direction of orientation of the GH liquid crystal on the transparent substrate 3.

The device can be driven in the same manner as that in which TN liquid crystal cell is used as the optical shutter, to obtain the same display. Although the contrast is reduced to some extent compared with the TN liquid crystal cell, the GH liquid crystal cell, helps reduce the dependency on the angle of viewing, and makes it possible to provide a color liquid crystal display device which produces a good display. Good results can also be obtained, even when the GH liquid crystal is oriented perpendicularly, by using an N-type nematic liquid crystal, or even when a GH liquid crystal of the cholestric-nematic phase transition type is used.

According to the present invention as described above, high contrast can be obtained without the need of back light that is required by the conventional system using color filters to compensate for a low transmission factor. The invention also eliminates the defect of the low contrast of the conventional system which employs a multi-color polarizing plate and which produces a reflection type of display that maintains a high transmission factor. In the former display, the number of effective picture elements (picture elements which do not produce black) is increased to produce the color display. In the latter display, color mixtures with white picture elements are prevented. Thus, the present invention realizes a color liquid crystal display device which features a high transmission factor and a high contrast.

In the embodiment of FIG. 3, the polarizing plate 2 is sandwiched between the substrates 4 and 9 of the cells A and B. It is, however, also possible to place transparent electrodes 12, 13 directly onto the polarizing plate 2, or to stick a polarizing plate onto a piece of transparent substrate and then form transparent electrodes thereon. It is further possible to provide the polarizing plate 1 on the liquid crystal side of the transparent substrate 3. If the thickness of the polarizing plate and the multi-color polarizing plate are reduced, a polarizing film can be formed on the transparent electrodes.

According to the present invention, furthermore, the first display cell with the optical shutter effect may be any cell, provided it utilizes an electrochromic phenomenon; or it may be a PLZT, provided it exhibits an optical shutter effect.

What is claimed is:

1. A color liquid crystal display device wherein a first display cell which has an optical shutter effect is disposed on a second TN liquid crystal cell which has a multi-color polarizing plate of double layer in which the absorption axes of respective layers have different absorption wavelength regions and are perpendicular to each other, and picture elements of said first liquid crystal cell and said second TN liquid crystal cell are arranged so as to correspond to each other.

2. A color liquid crystal display device as set forth in claim 1 wherein said first display cell is made up of a TN type liquid crystal cell sandwiched by a pair of polarizers.

3. A color liquid crystal display device as set forth in claim 1 wherein said first display cell is made up of a GH liquid crystal cell containing black dichromic coloring matter.

* * * * *